United States Patent
Furukoshi (12) United States Patent (10) Patent No.: US 6,390,279 B1
Furukoshi (45) Date of Patent: May 21, 2002

(54) METHOD AND APPARATUS FOR CONVEYING WORKS

(75) Inventor: Tsugio Furukoshi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/480,499

(22) Filed: Jan. 11, 2000

(30) Foreign Application Priority Data

Jan. 14, 1999 (JP) .......................................... 11-008263
Jan. 14, 1999 (JP) .......................................... 11-008274

(51) Int. Cl.[7] ........................ B65G 29/00; B65G 37/00; B65G 47/84; B65G 49/00
(52) U.S. Cl. ..................... 198/465.1; 198/602; 198/604; 198/605
(58) Field of Search .............................. 198/465.1, 602, 198/604, 605

(56) References Cited

U.S. PATENT DOCUMENTS

| 4,014,428 A | * | 3/1977 | Ossbahr | 198/465.1 X |
|---|---|---|---|---|
| 4,267,918 A | * | 5/1981 | Steinbrecher | 198/465.1 X |
| 4,289,228 A | * | 9/1981 | Reim et al. | 198/465.1 X |
| 4,411,354 A | * | 10/1983 | Thibault et al. | 198/465.1 X |
| 4,499,794 A | * | 2/1985 | Beck et al. | 198/465.1 X |
| 4,625,858 A | * | 12/1986 | Fukui | 198/465.1 X |
| 4,713,883 A | * | 12/1987 | Santandrea et al. | 198/465.1 X |
| 5,207,051 A | * | 5/1993 | Inger et al. | 198/465.1 X |

FOREIGN PATENT DOCUMENTS

JP 4-183537 6/1992
JP 2689185 8/1997

* cited by examiner

Primary Examiner—Christopher P. Ellis
Assistant Examiner—Gene O. Crawford
(74) Attorney, Agent, or Firm—McDermott, Will & Emery

(57) ABSTRACT

A work conveying apparatus is comprised of a conveying rail for moving carriages with works and a returning rail for returning the carriages without works to the conveying rail. The returning rail is disposed along the conveying rail while being perpendicularly inclined from the conveying rail. Selector rails are disposed at both ends of the conveying rail, respectively. The selector rails are swingable between a horizontal position extending from the conveying rails and a vertical position extending from the returning rail. The selector rails are swung to transfer the carriages between the conveying rail and the returning rail.

10 Claims, 11 Drawing Sheets

METHOD AND APPARATUS FOR CONVEYING WORKS

BACKGROUND OF THE INVENTION

The present invention relates to a method and apparatus for continuously conveying works by circulatingly moving a plurality of conveying carriages for supporting the works.

Various work conveying apparatuses have been proposed and in practical use. A typical work conveying apparatus has been arranged to dispose a conveying rail above a returning rail. A plurality of conveying carriages are circulated between the conveying rail and the returning rail through a pair of lifter mechanisms. More specifically, a conveying carriage conveyed on the conveying rail is transferred to the returning rail through a carriage receiving base, a carriage put-out mechanism, the lifter mechanism and a carriage put-in mechanism. Similarly, the conveying carriage conveyed on the returning rail is transferred to the conveying rail through a carriage receiving base, a carriage put-out mechanism, the lifter mechanism and a carriage put-in mechanism.

SUMMARY OF THE INVENTION

However, such a conventional work conveying apparatus is complicated in structure and operation, and therefore a cycle time of this apparatus is limited by these complicated structure and operation.

It is an object of the present invention to provide an improved work conveying apparatus and method which is simplified in structure and operation and improves its operation speed thereby to decrease a cycle time in operation.

An aspect of the present invention resides in a work conveying apparatus which comprises a conveying rail and a returning rail, a starting-stage selector rail, a terminating-stage selector rail, a plurality of conveying carriages and a carriage drive mechanism. The returning rail is disposed along the conveying rail. The starting-stage selector rail is parallel to the conveying rail and is swingable between a first position straightly extending from an end of the conveying rail and a second position straightly extending from an end of the returning rail. The terminating-stage selector rail is parallel to the conveying rail and is swingable between a third position straightly extending from the other end of the conveying rail and a fourth position straightly extending from the other end of the returning rail. A plurality of conveying carriages are conveyed on the conveying rail and the returning rail to convey works from the starting-stage selector rail through the conveying rail. A carriage drive mechanism moves the conveying carriages on the conveying rail, the return rail, the starting-stage selector rail and the terminating-stage selector rail. The carriage drive mechanism comprises a reciprocating member and a supporting member, the reciprocating member being disposed along the conveying rail and being reciprocatingly movable along the conveying rail, the supporting member is connected to the reciprocating member and being selectively connected to a portion of each of the conveying carriages.

Another aspect of the present invention resides in a work conveying apparatus comprising a conveying rail, a returning rail disposed along the conveying rail, and a starting-stage selector rail parallel to the conveying rail. The starting-stage selector rail is swingable between a first position straightly extending from an end of the conveying rail and a second position straightly extending from an end of the returning rail. A terminating-stage selector rail is parallel to the conveying rail, the terminating-stage selector rail being swingable between a third position straightly extending from the other end of the conveying rail and a fourth position straightly extending from the other end of the returning rail. The apparatus also includes a plurality of conveying carriages moved on the conveying rail and the returning rail, the conveying carriage conveying a work from the starting-stage selector rail to the terminating-stage selector rail through the conveying rail. The apparatus further includes a carriage drive mechanism moving the conveying carriages on the conveying rail, the return rail, the starting-stage selector rail and the terminating-stage selector rail, the carriage drive mechanism comprising a carriage conveying mechanism which moves the conveying carriages disposed on the conveying rail and the starting-stage selector rail set at the first position in a conveying direction, and a carriage returning mechanism which moves the conveying carriages disposed on the returning rail and the terminating-stage selector rail set at the fourth position in a returning direction. The carriage conveying mechanism comprises a conveying finger lever connected to the conveying carriage and a carriage transfer mechanism which is disposed under the conveying rail, the carriage transfer mechanism reciprocatingly moving the conveying finger lever along the conveying direction.

Yet another aspect the present invention resides in a work conveying apparatus which comprises a conveying rail, a returning rail disposed along the conveying rail, and a starting-stage selector rail parallel to the conveying rail. The starting-stage selector rail is swingable between a first position straightly extending from an end of the conveying rail and a second position straightly extending from an end of the returning rail. A terminating-stage selector rail is parallel to the conveying rail, the terminating-stage selector rail being swingable between a third position straightly extending from the other end of the conveying rail and a fourth position straightly extending from the other end of the returning rail. The apparatus also includes a plurality of conveying carriages moved on the conveying rail and the returning rail, the conveying carriage conveying a work from the starting-stage selector rail to the terminating-stage selector rail through the conveying rail. The apparatus further includes a carriage drive mechanism moving the conveying carriages on the conveying rail, the return rail, the starting-stage selector rail and the terminating-stage selector rail. The carriage drive mechanism comprises a carriage conveying mechanism which moves the conveying carriages disposed on the conveying rail and the starting-stage selector rail set at the first position in a conveying direction, and a carriage returning mechanism which moves the conveying carriages disposed on the returning rail and the terminating-stage selector rail set at the fourth position in a returning direction. The carriage returning mechanism comprises a returning finger lever connected to the conveying carriage and a carriage transfer mechanism which is disposed under the conveying rail, the carriage transfer mechanism reciprocatingly moving the returning finger lever along the returning direction.

Still another aspect of present invention resides in a work conveying apparatus which comprises a conveying rail, a returning rail disposed along the conveying rail, and a starting-stage selector rail parallel to the conveying rail. The starting-stage selector rail is swingable between a first position straightly extending from an end of the conveying rail and a second position straightly extending from an end of the returning rail. A terminating-stage selector rail is parallel to the conveying rail, the terminating-stage selector rail being swingable between a third position straightly extending from the other end of the conveying rail and a fourth position straightly extending from the other end of the returning rail. The apparatus also includes a plurality of conveying carriages moved on the conveying rail and the returning rail, the conveying carriage conveying a work from the starting-stage selector rail to the terminating-stage selector rail through the conveying rail. The apparatus further includes a carriage drive mechanism moving the conveying carriages on the conveying rail, the return rail, the starting-stage selector rail and the terminating-stage selector rail. The carriage drive mechanism comprises a carriage conveying mechanism which moves the conveying carriages disposed on the conveying rail and the starting-stage selector rail set at the first position in a conveying direction, and a carriage returning mechanism which moves the conveying carriages disposed on the returning rail and the terminating-stage selector rail set at the fourth position in a returning direction. The carriage returning mechanism comprises a starting-stage sprocket disposed in the vicinity of said starting-stage selector rail, a terminating-stage sprocket in the vicinity of the terminating-stage selector rail, an endless chain wound around the starting-stage sprocket and the terminating-stage sprocket, a return projection which is projected from each of the conveying carriages, and a plurality of fixing projections installed to the endless chain at predetermined intervals, the fixing projections being in contact with the return projections, respectively, when the conveying carriages are returned from the terminating stage to the starting stage.

Another aspect of the present invention resides in a work conveying method which comprises a step for moving a plurality of conveying carriages continuously set on a conveying rail and a starting-stage selector rail by one pitch in a conveying direction; a step for detaching a work from the conveying carriage set on the terminating-stage selector rail; a step for displacing the starting-stage selector rail and a terminating-stage selector rail from first positions straightly extending from ends of the conveying rail to second positions straightly extending from ends of a returning rail; a step for moving the plurality of the conveying carriages continuously set on the returning rail and the terminating-stage selector rail by one pitch in a returning direction; a step displacing the starting-stage selector rail and the terminating-stage selector rail from the second positions to the first positions; and a step for attaching a work to the conveying carriage set on the starting-stage selector rail.

BRIEF DESCRIPTION OF THE DRAWINGS

In the drawings, like reference numerals denote like elements and components throughout all figures, in which.

DETAILED DESCRIPTION OF THE INVENTION

Referring to FIGS. 1 to 7, there is shown a first embodiment of a method and apparatus for conveying works in accordance with the present invention.

Figure 1:
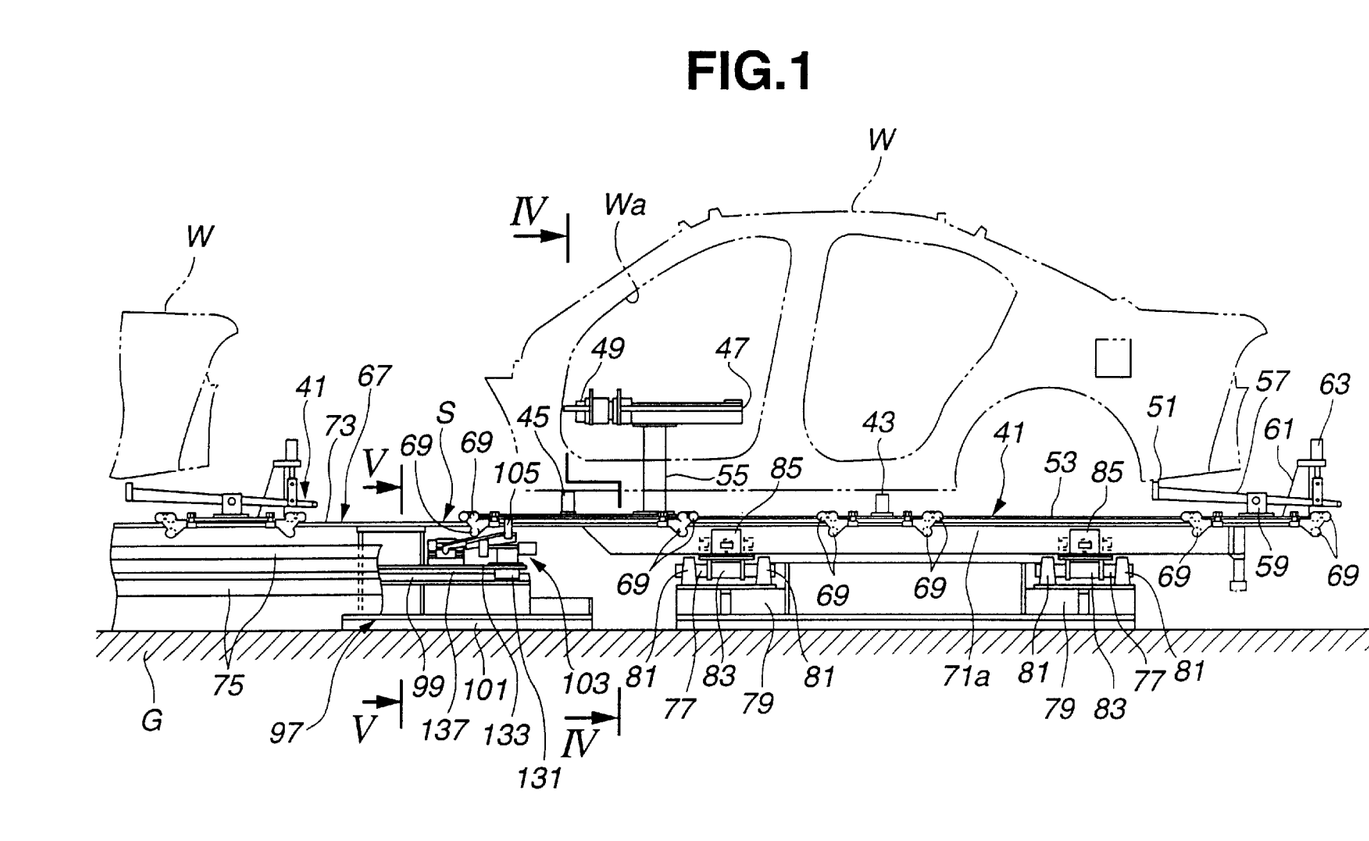
FIG. 1 is a partial side view showing a starting stage of a work conveying apparatus of a first embodiment according to the present invention.
Figure 2:
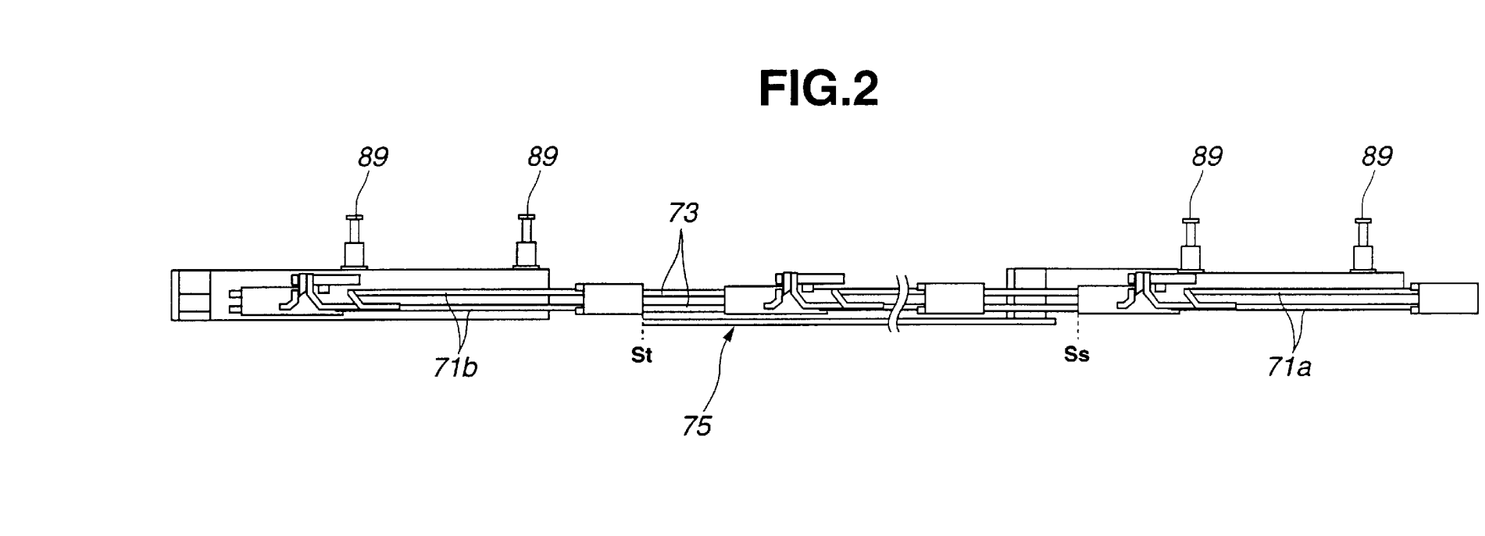
FIG. 2 is a top view showing the work conveying apparatus including the starting stage and a terminating stage and a part of conveying stages therebetween.
Figure 3:
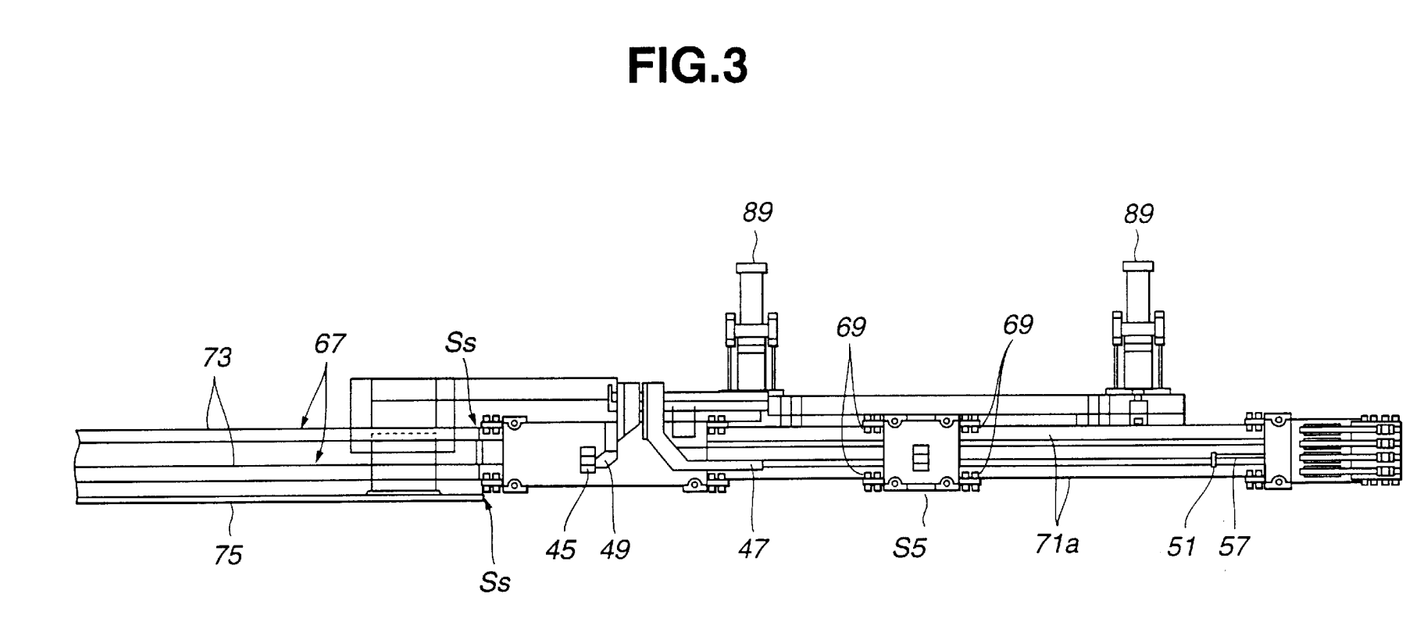
FIG. 3 is a partial top view of the work conveying apparatus of the first embodiment.

As shown in FIGS. 1 and 3, the work conveying apparatus according to the present invention is arranged to linearly extend from a left hand side toward a right hand side to convey works W from a starting stage shown in FIG. 1 toward a terminating stage located at a leftmost side in FIG. 2. The work conveying apparatus is horizontally provided on a flat ground G through a base. A plurality of conveying carriages 41 for respectively supporting works W thereon are continuously disposed on guide rails 67 along a conveying direction of the work conveying apparatus. These conveying carriages 41 are conveyed toward the left hand side direction of FIGS. 2 and 3 by one pitch corresponding to a length of each stage of the work conveying apparatus.

The conveyed work W in this embodiment is a body side-panel of an automotive vehicle to be worked on each stage of the work conveying apparatus. The conveying carriage 41 comprises two work supporting tools 43 and 45 for supporting lower end portions of the work W, a pair of opening supporting tools 47 and 49 for supporting an opening Wa of the work W in the fore-and-aft direction, a rear supporting tool 51 for supporting a lower and rear end portion of the work W and a base plate 53. These supporting tools 43, 45, 47, 49 and 51 are installed on the base plate 53.

The opening supporting tools 47 and 49 are installed on the base plate 52 through a mount 55 and are extendable in the fore-and-aft direction by means of air-cylinder drive. The rear supporting tool 51 is installed at an end portion of a swing arm 57 which is installed on a bracket 59 mounted on the base plate 53. The swing arm 57 is swingable on the bracket 59 along a vertical plane corresponding to a paper surface of FIG. 1 so as to be able to adjust the height of the rear and lower end portion of the work W. By vertically moving the other end portion of the swing arm 57 by means of an air-cylinder 63 installed to the base plate 53, the rear supporting tool 51 is vertically moved to vary the height level of the rear end portion of the work W.

The conveying carriage 41 comprises a plurality of roller units 69 which clamp a pair of guide rails 67 disposed along a work conveying direction. Each roller unit 69 rotatably clamps the guide rails 67 of a plate shape in the vertical direction as shown in FIG. 1. The guide rails 67 in the starting stage is divided at a boundary Ss between the starting stage and a second state as shown in FIGS. 2 and 3. The divided rails of the starting stage are starting-stage selector rails 71a. Further, the guide rails 67 are divided at a boundary St between the terminating stage and its adjacent stage as shown in FIG. 2. The divided rails 67 of the terminating stage are terminating-stage selector rails 71b. The guide rails 67 located between the boundaries Ss and St are conveying rails 73. Therefore, each conveying carriage 41 is moved from the starting-stage selector rails 71a through the conveying rails 73 to the terminating-stage rails 71b while supporting the work W.

A pair of returning rails 75 having the form as same as that of the guide rails 65 are disposed on a vertical plane which is parallel with and perpendicular to the plane including the guide rails 67, as shown in FIG. 2. The returning rails 75 function to guide the conveying carriage 41 without the work W from the terminating stage to the starting stage.

Figure 4:
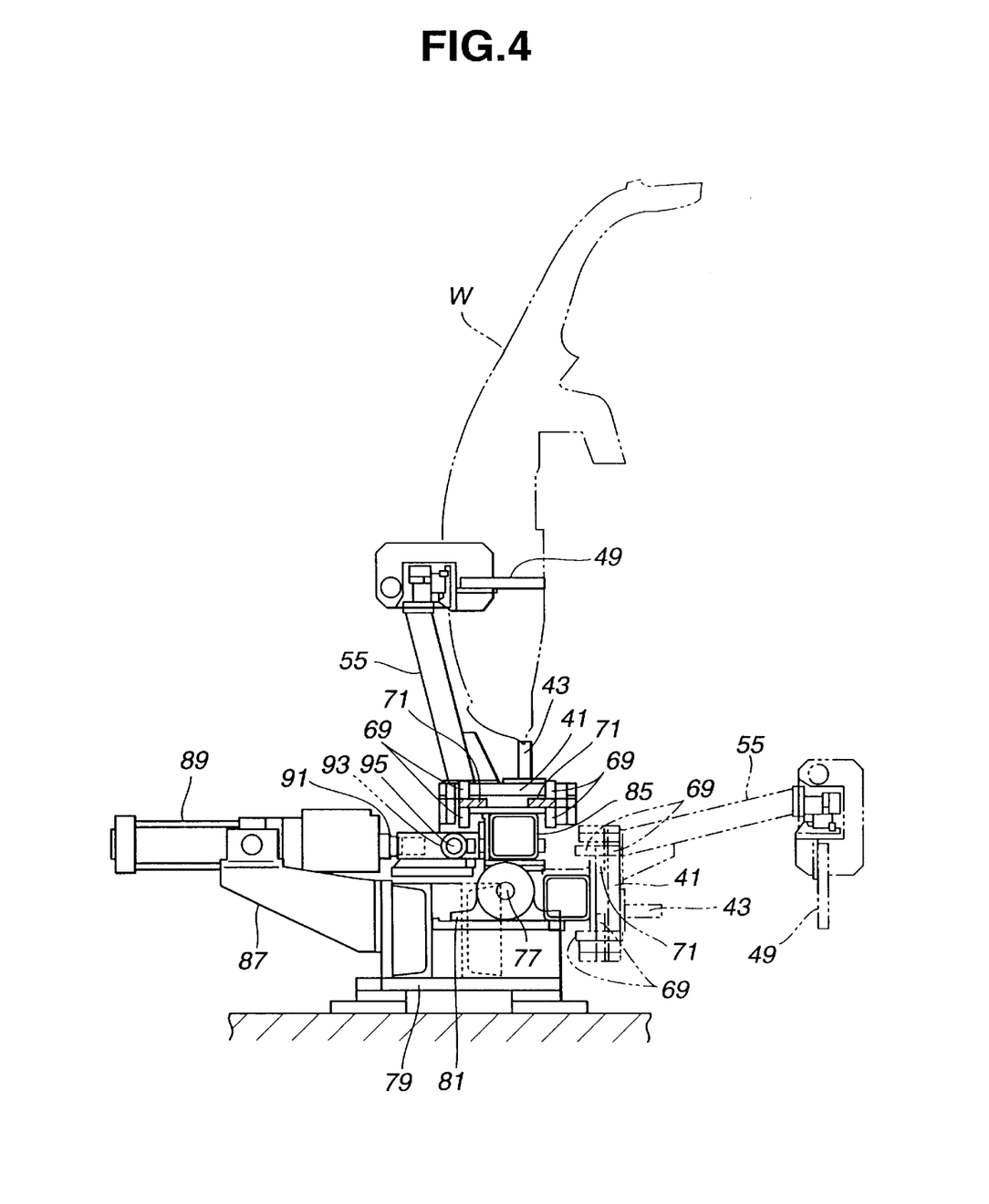
FIG. 4 is a cross-sectional view taken in the direction of arrows substantially along the line IV—IV of FIG. 1.

As shown in FIG. 4, the starting-stage selector rails 71a are swingable on a pair of supporting shafts 77 directed along the conveying direction. The starting-stage selector rails 71a are swung between a horizontal position represented by continuous lines and a vertical position represented by two-dot chain lines. When the starting-stage selector rails 71a are positioned at the horizontal position, they are positioned on the line extending from the conveying rails 73. Further, when the starting-stage selector rails 71a are positioned at the vertical position, they are positioned on the line extending from the returning rails 75. Each supporting shaft 77 is supported by a pair of supporting brackets 81 set on a base 79, as shown in FIG. 1. The starting-stage selector rails 71a are fixed to intermediate portions of a pair of rotation supporting members 83 rotatably supported by the supporting brackets 81 through connecting members 85, as shown in FIG. 1.

As shown in FIGS. 3 and 4, a pair of air-cylinders 89 for rotating the starting-stage selector rails 71a are installed to the base 79 through cylinder brackets 87, respectively. A tip end of a piston rod 91 of the air-cylinder 89 is rotatably connected through a pin 95 to a bracket 93 disposed at a laterally side portion of the connecting member 85. Therefore, by moving the piston rod 91 toward the right hand side direction in FIG. 4, the starting-stage selector rails 71a are swung from the horizontal position represented by the continuous lines to the vertical position represented by the two-dot chain lines shown in FIG. 4.

The terminating-stage selector rails 71b are also swingable between a horizontal-position extending from the conveying rails 73 and a vertical position extending from the returning rails 75.

Figure 5:
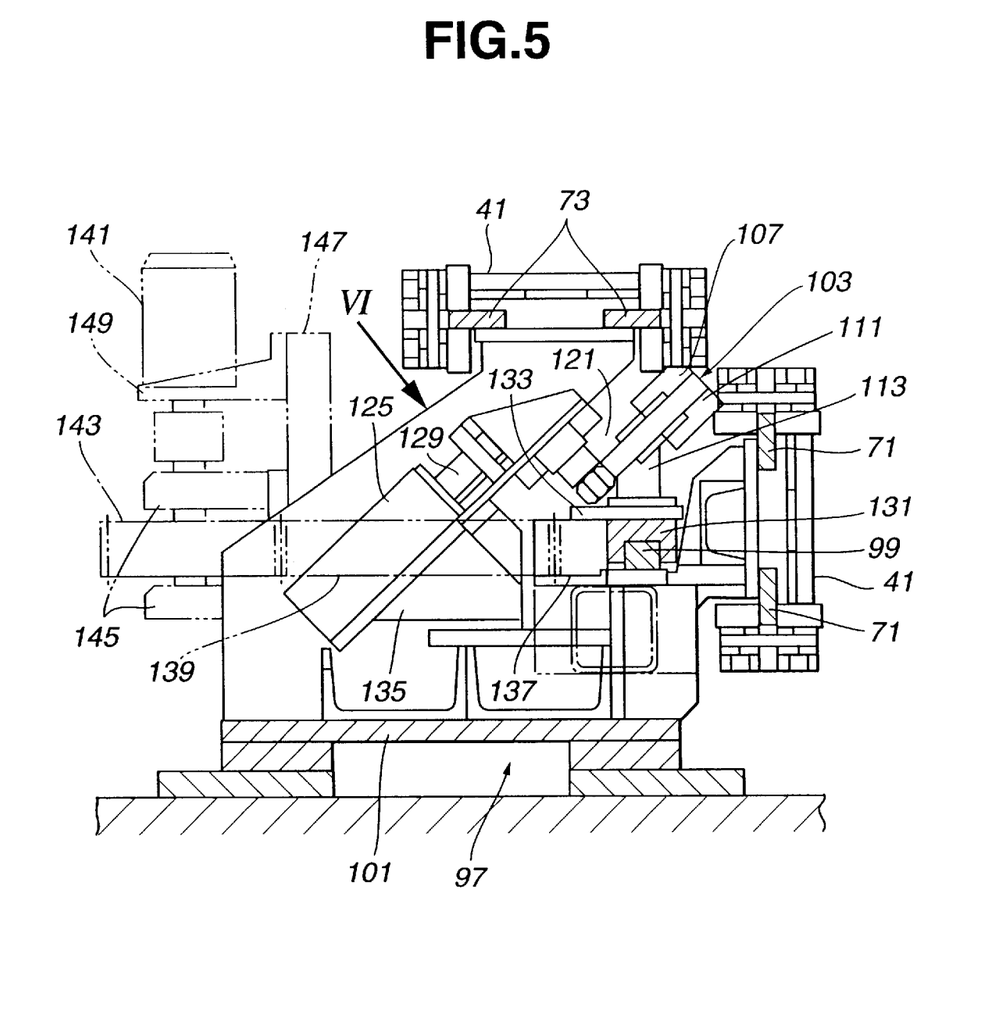
FIG. 5 is a cross-sectional view taken in the direction of arrows substantially along the line V—V of FIG. 1.
Figures 6, 7:
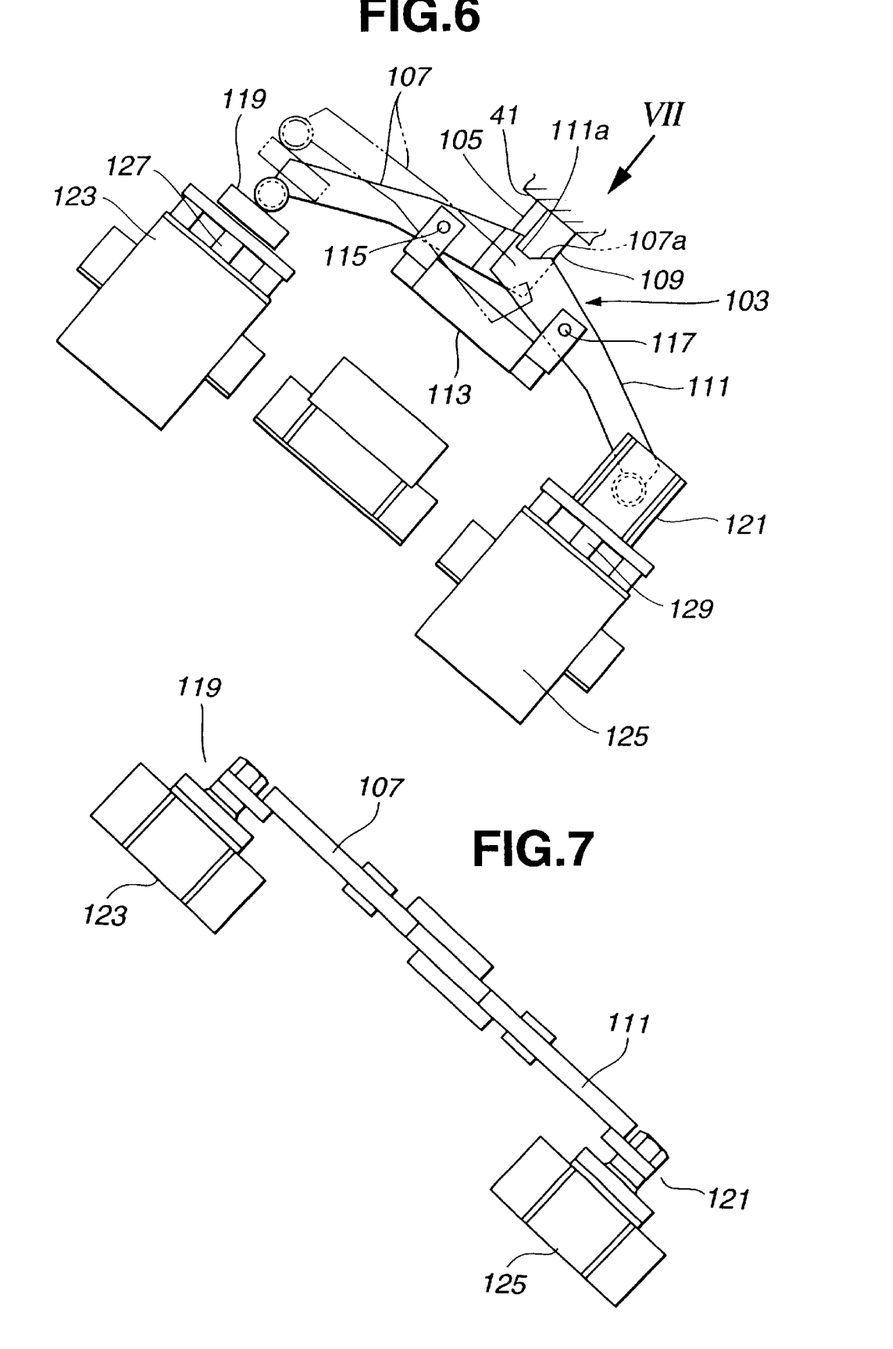
FIG. 6 is a view taken in the direction of the arrow VI of FIG. 5.
FIG. 7 is a view taken in the direction of the arrow VII of FIG. 6.

A plurality of carriage conveying mechanisms 97 are provided in the plurality of stages corresponding to the conveying carriages 41 set on the conveying rails 73 between the starting-stage rails 71a and the terminating-stage rails 71b, respectively. As shown in FIG. 5, the carriage conveying mechanism 97 is disposed under the conveying rails 73 and on a base 101 of the work conveying apparatus so that a direct guide rail 99 is parallel to the conveying rails 73 and that a work supporting mechanism 103 reciprocatingly moves on the direct guide rails 99 along the work conveying direction.

The work supporting mechanism 103 comprises a conveying finger lever 107 and a returning finger lever 111. The conveying finger lever 107 functioning as a swing lever is connectable to a conveying projection 105 installed at a front end portion of each conveying carriage 41 to support the conveying carriage 41. The returning finger lever 111 functioning as a swing lever is connectable to a returning projection 109 installed at a front end portion of each conveying carriage 41 to support the conveying carriage 41 in the returning stages.

When the conveying carriage 41 is located on the starting-stage selector rails 71a or the terminating-stage selector rails 71b which is positioned at the horizontal position extending from the conveying rails 73, the conveying finger lever 107 is connected to the conveying projection 105. Further, when the conveying carriage 41 is located on the starting-stage selector rails 71a or the terminating-stage selector rails 71b which is positioned at the vertical position extending from the returning rails 75, the returning finger lever 111 is connected to the returning projection 109.

In addition to the conveying and returning projections 105 and 109 installed at the front end portion of the conveying carriage 41, other projections similar to the projections 105 and 109 are installed at rear end portions of the conveying carriage 41 although not shown in Figures. When the conveying carriage 41 is conveyed from the foremost stage on the conveying rails 73 to the terminating stage, the other work supporting mechanism 103b supports the other projections 105b and 109b. If the conveying carriage 41 is conveyed to the terminating-stage selector rails 71b by supporting the projections 103a and 105a provided at the front end portions of the conveying carriage 41 by means of the work supporting mechanism 103a provided at the front end portions of the conveying carriage 41, the work supporting mechanism 103a interferes with a rail selector mechanism of the terminating-stage selector rails 71b. Therefore, these projections 105b and 109b and the work supporting mechanism 103b are provided.

The conveying finger lever 107 is swingably supported at a pine 115 fixed to the supporting bracket 113, and a depressed portion 107a is formed at a tip end portion of the conveying finger lever 107 so as to be connected to the conveying projection 105. The other end portion of the conveying finger lever 107 is connected to a piston rod 127 of a lever selector cylinder 123 through a joint 119. Similarly, the returning finger lever 111 is swingably supported at a pin 117 fixed to the supporting bracket 113, and a depressed portion 111a is formed at a tip end portion of the returning finger lever 107 so as to be connected to the returning projection 109. The other end portion of the returning finger lever 111 is connected to a piston rod 129 of a lever selector cylinder 125 through a joint 121. Accordingly, by elongating or shortening a projecting amount of each of the piston rods 127 and 129, each of the finger levers 107 and 111 is swung on each of pins 115 and 117. By these swing movements of the finger levers 107 and 111, the finger levers 107 and 111 are connected to and disconnected from the projections 105 and 109, respectively.

As shown in FIG. 5, the swing supporting bracket 113 is fixed through a conveying bar 133 to an upper portion of the direct drive guide 131 which is engaged with the direct guide rail 99. The lever selector cylinders 123 and 125 are fixed to the conveying bar 133 through a cylinder bracket 135.

A rack 137 is fixed to the conveying bar 133 along the longitudinal direction of the conveying bar 133 and is meshed with a pinion 139. The pinion 139 is meshed with a drive gear 143 driven by a drive motor 141. The drive gear 143 is rotatably supported to a supporting member 147 through a motor bracket 149. The supporting member 147 is fixed to the base 101.

The conveying bar 133 is reciprocated in the work conveying direction according to the right and reverse rotations of the drive motor 141. According to the movement of the conveying bar 133, the work supporting mechanism 103 is reciprocated to convey the conveying carriage 41 with the work W and to return the conveying carriage 41 without the work W.

Next, the manner of operation of the work conveying apparatus of the first embodiment will be discussed.

Under the condition shown in FIG. 1, the starting-stage selector rails 71a and the terminating-stage selector rails 71b are located at the horizontal positions extending from the conveying rails 73, respectively. Under this condition, the rearmost conveying carriage 41 is set on the starting-stage selector rails 71a, and the foremost conveying carriage 41 is set on the conveying rails 73 adjacent to the terminating-stage selector rails 71b. Further, the other conveying carriages 41 are continuously set on the conveying rails 73 between the foremost and rearmost conveying carriages 41. That is, under this condition, no conveying carriage 41 is set on the terminating-stage selector rails 71b. Of course, the other conveying carriages 41 are continuously set on the returning rails 75.

First, the conveying finger levers 107 and the returning finger levers 111 are set such that the projections 105 of the conveying carriages 41 on the conveying rails 73 and the starting-stage selector rails 71a are supported to the conveying finger levers 107, respectively, and that the returning projections 109 of the conveying carriages 41 on the returning rails 51 are not supported to the returning finger levers 111. Then, the drive motor 141 is rotated in the right direction. By these operations, the pinion 139 is rotated and the rack 137 is moved by one pitch toward the conveying direction together with the conveying bar 133. Due to this one-pitch movement, each conveying carriage 41 on the guide rails 67 is conveyed in the conveying direction by one-pitch. According to this one-pitch movement of the conveying carriage 41, the foremost carriage 41 on the conveying rails 73 adjacent the terminating-stage selector rails 71b is moved to the terminating-stage selector rails 71b, and the work W set on the conveying carriage 41 of the terminating state is then detached from the conveying carriage 41. The conveying carriage 41 on the starting-stage selector rails 71a is moved to the conveying rails 73 adjacent to the starting-stage selector rails 71a. Therefore, as a result of this operation, no conveying carriage 41 exists on the starting-stage selector rails 71a.

Next, the rail selecting cylinder 89 shown in FIG. 3 is operated to rotate the starting-stage selector rails 71a by 90 degrees from the horizontal position represented by continuous lines in FIG. 4 to the vertical position represented by the two-dot chain lines in FIG. 4. Similarly, the terminating-stage selector rails 71b are rotated by 90 degrees from the horizontal position to the vertical position.

Thereafter, the returning projections 109 of the conveying carriages 41 set on the returning rails 75 without the work W are supported to the returning finger levers 111, respectively. On the other hand, the conveying finger levers 107 are released from the projections 105 of the conveying carriages 41 set on the conveying rails 73. Next, the drive motor 141 is rotated in the reverse direction. By these operations, the pinion 139 is rotated and the rack 137 is moved by one pitch toward the returning direction together with the conveying bar 133. Due to this one-pitch returning movement, each conveying carriage 41 on the returning rails 75 is conveyed in the returning direction by one-pitch. According to this one-pitch returning movement of the conveying carriage 41, the conveying carriage 41 on the terminating-stage selector rails 71b is moved to the returning rails 75 adjacent to the terminating-stage selector rails 71b, and the conveying carriage 41 on the conveying rails 73 adjacent to the terminating state is moved to the terminating-stage selector rails 71b.

Under this condition, the rail selector cylinder 89 is then operated to rotate the starting-stage selector rails 71a with the conveying carriage 41 from the vertical position to the horizontal position by 90 degrees. Then, the new work W is installed to the conveying carriage 41 set on the starting-stage selector rails 71.

Thereafter, each conveying carriage 41 on the conveying rails 73 is again moved in the conveying direction by one pitch as mentioned above. By repeatedly executing the above-mentioned operations, the works W are continuously conveyed by the work conveying apparatus according to the present invention.

With the thus arranged work conveying apparatus of the first embodiment according to the present invention, the conveying carriage 41 of the returning rails 75 is moved to the conveying rails 73 by rotating the starting-stage selector rails 71a by 90 degrees, and the conveying carriage 41 set on the conveying rails 73 is moved to the returning rails 75 by rotating the terminating-stage selector rails 71b by 90 degrees. This arrangement simplifies the total structure of this conveying system. Therefore, it becomes possible to decrease the production cost of this apparatus. Further, since the cycle time of the apparatus is shortened, the work conveying time is shortened. Furthermore, the arrangement of the conveying rails 73 and the returning rails 75 enables the size of the apparatus to be decreased as compared with the conventional apparatuses.

Referring to FIGS. 8 to 13, there is shown a second embodiment of the work conveying apparatus and method thereof according to the present invention.

The construction of the second embodiment is basically the same as that of the first embodiment except for a construction of a carriage returning mechanism 151 of the carriage drive mechanism 97. Therefore, in this embodiment like reference numeral denote like parts and elements of the first embodiment as shown in FIGS. 8 to 13, and the explanation thereof will be omitted herein. Herein, only the carriage returning mechanism 151 and the manner of operation of the work conveying apparatus of the second embodiment will be discussed.

Figure 10:
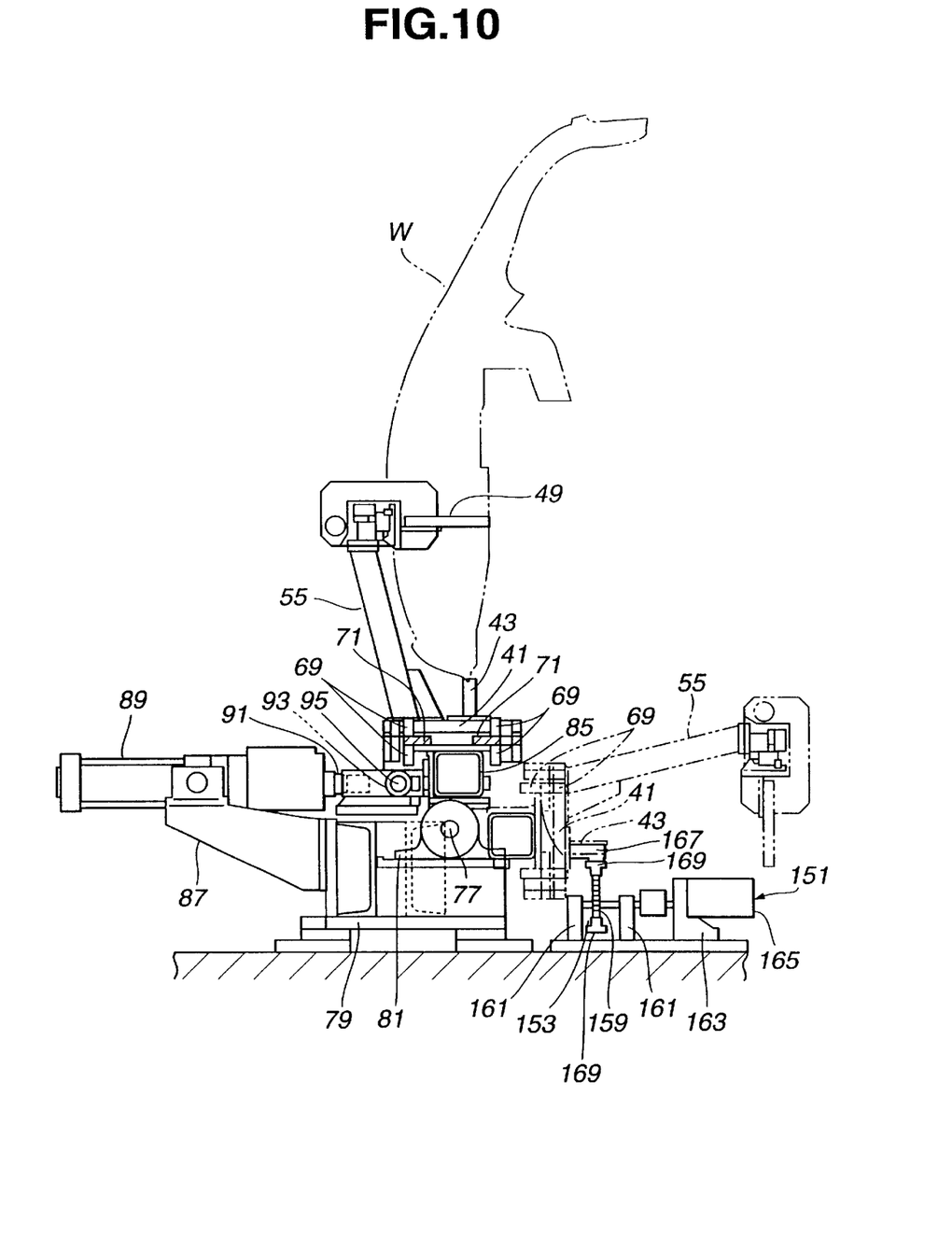
FIG. 10 is a cross-sectional view taken in the direction of arrows substantially along the line X—X of FIG. 9.
Figure 11:
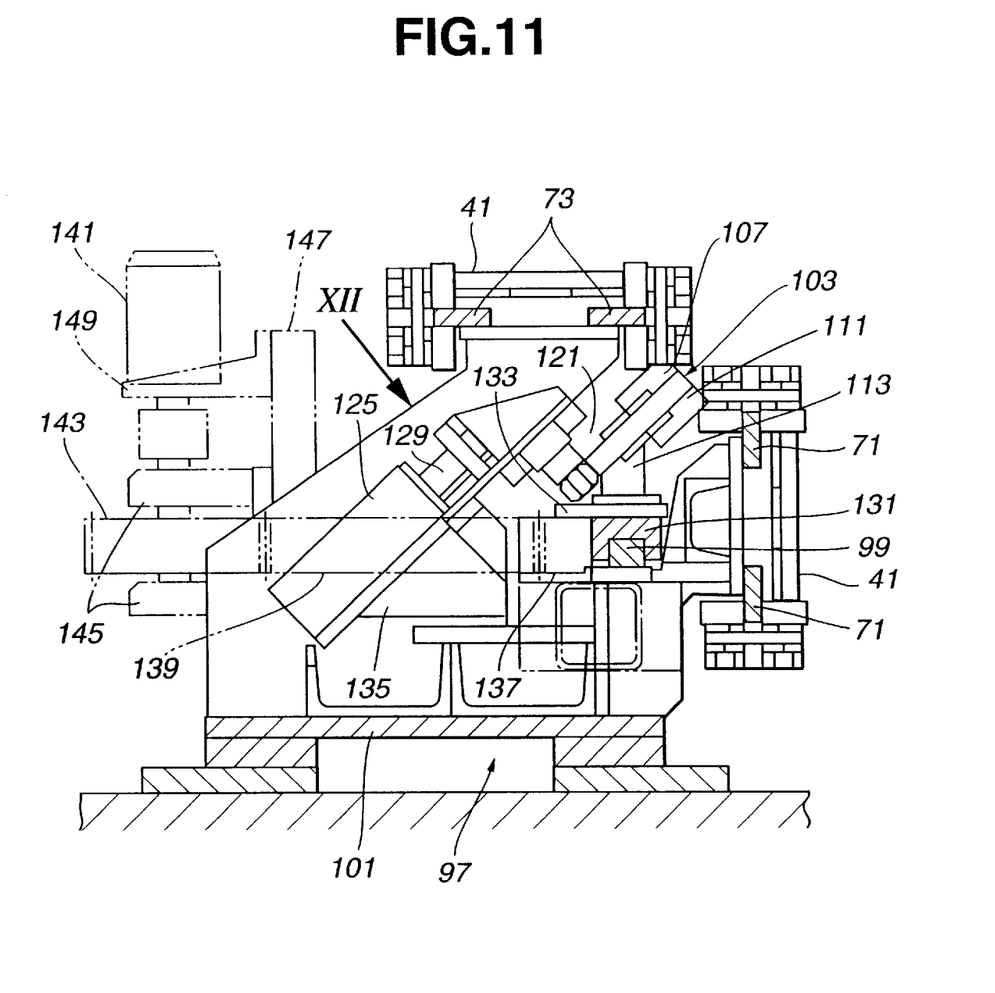
FIG. 11 is a cross-sectional view taken in the direction of arrows substantially along the line XI—XI of FIG. 9.
Figure 12:
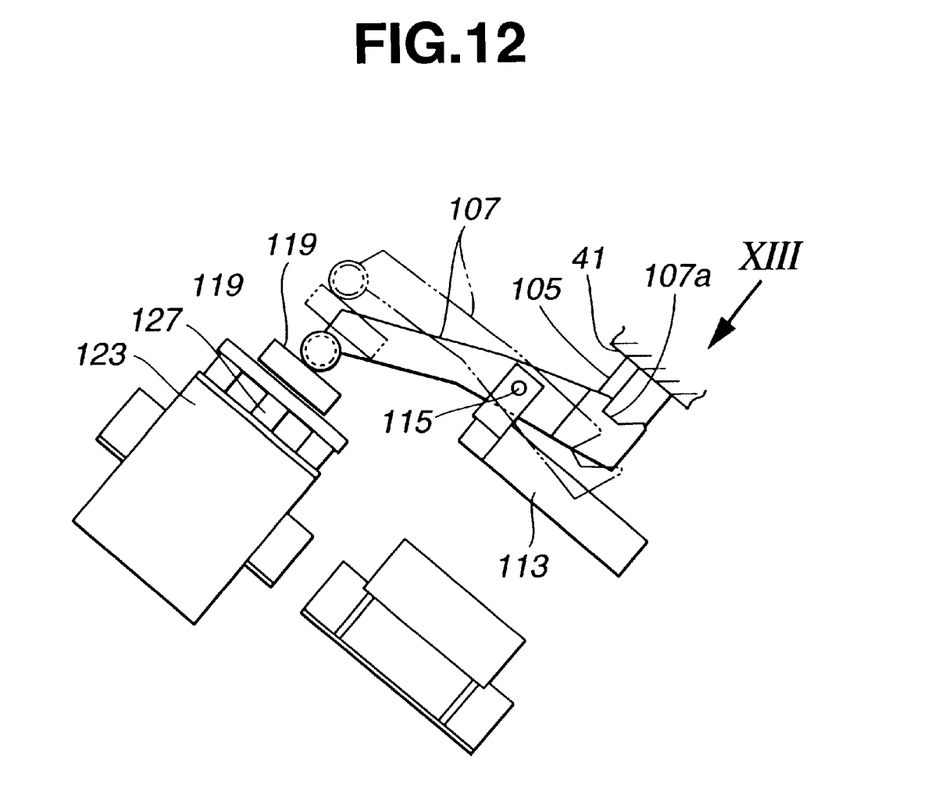
FIG. 12 is a view taken in the direction of the arrow XII of FIG. 11.
Figure 13:
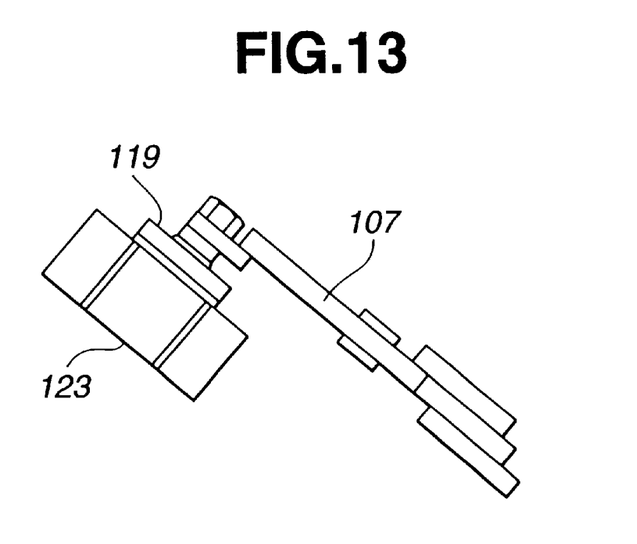
FIG. 13 is a view taken in the direction of the arrow XIII of FIG. 12.

The carriage returning mechanism 151 shown in FIG. 10 functions to return the conveying carriage 41 without the work W toward the starting stage. The carriage returning mechanism 151 comprises an endless chain 153 which is disposed at a position laterally adjacent to the returning rails 75 and along the work conveying direction. The work returning mechanism 151 shown in FIG. 10 is practically disposed in the vicinity of the terminating stage. The endless chain 153 is wound around a starting-stage sprocket 155 disposed in the vicinity of the frond end of the starting stage selector rails 71a. The sprocket 155 is rotatably supported to a rotation supporting bracket 157.

The other side of the endless chain 153 is wound around a terminating-stage sprocket 159 disposed in the vicinity of the rear end of the terminating stage. The terminating-stage sprocket 159 is rotatably supported to a rotation supporting bracket 161. The terminating-stage sprocket 159 is driven by a returning drive motor 165 supported to a cylinder bracket 163.

A return projection 167 is projected from each conveying carriage 41 toward the chain 153 as shown in FIG. 10. The chain 153 is provided with a plurality of fixing projections 169 at predetermined intervals corresponding to the interval of the conveying carriages 41.

The fixing projections 169 are engaged with the return projections 167 according to the reverse rotation of the terminating-stage sprocket 159 to move the chain 153 in contact with the return projection 157 through the fixing projection 159, the conveying carriage 41 is moved in the returning direction.

Next, the manner of operation of the work conveying apparatus of the second embodiment according to the present invention will be discussed.

Figure 8:
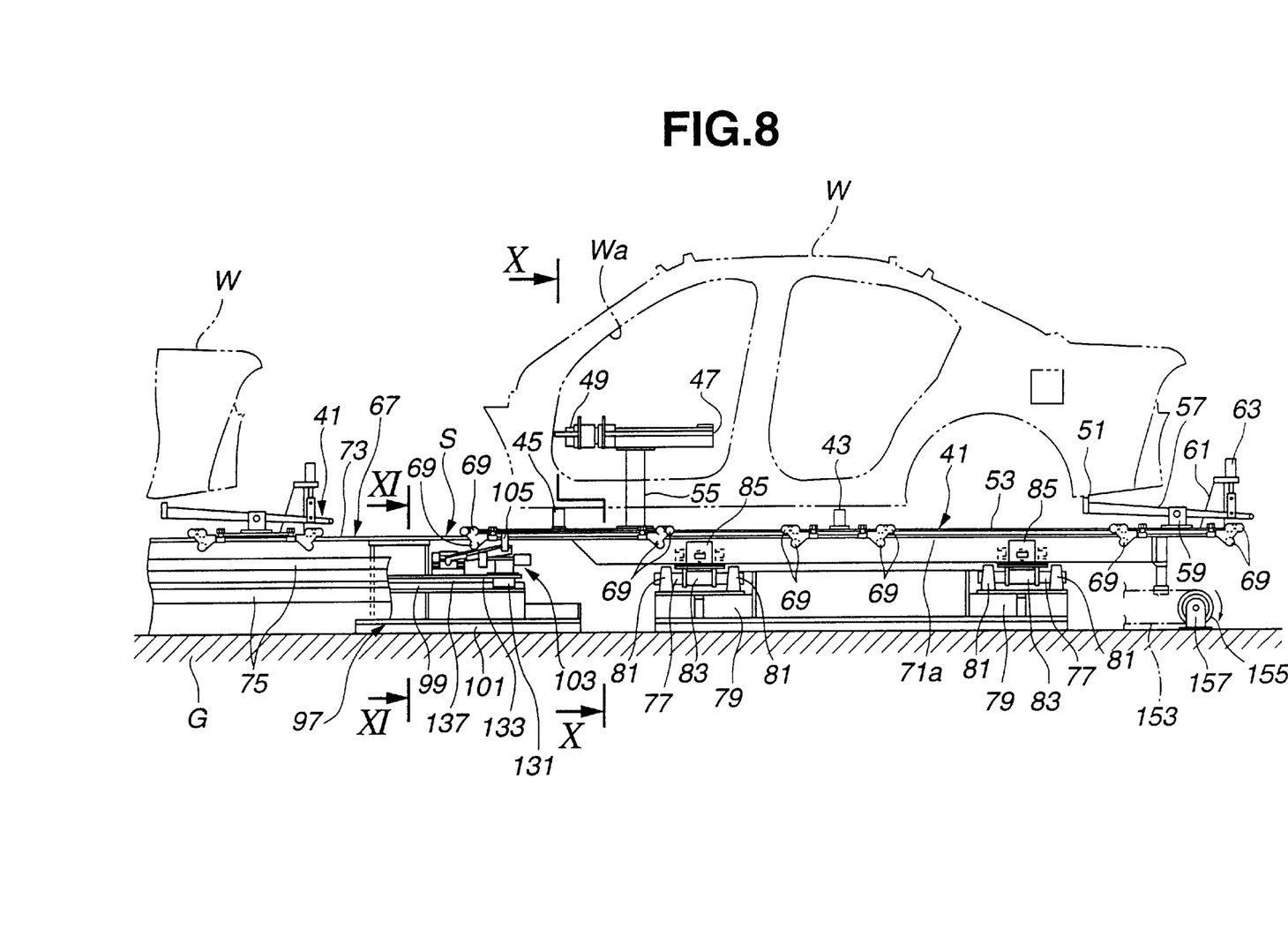
FIG. 8 is a partial side view showing a starting stage of the work conveying apparatus of a second embodiment according to the present invention.
Figure 9:
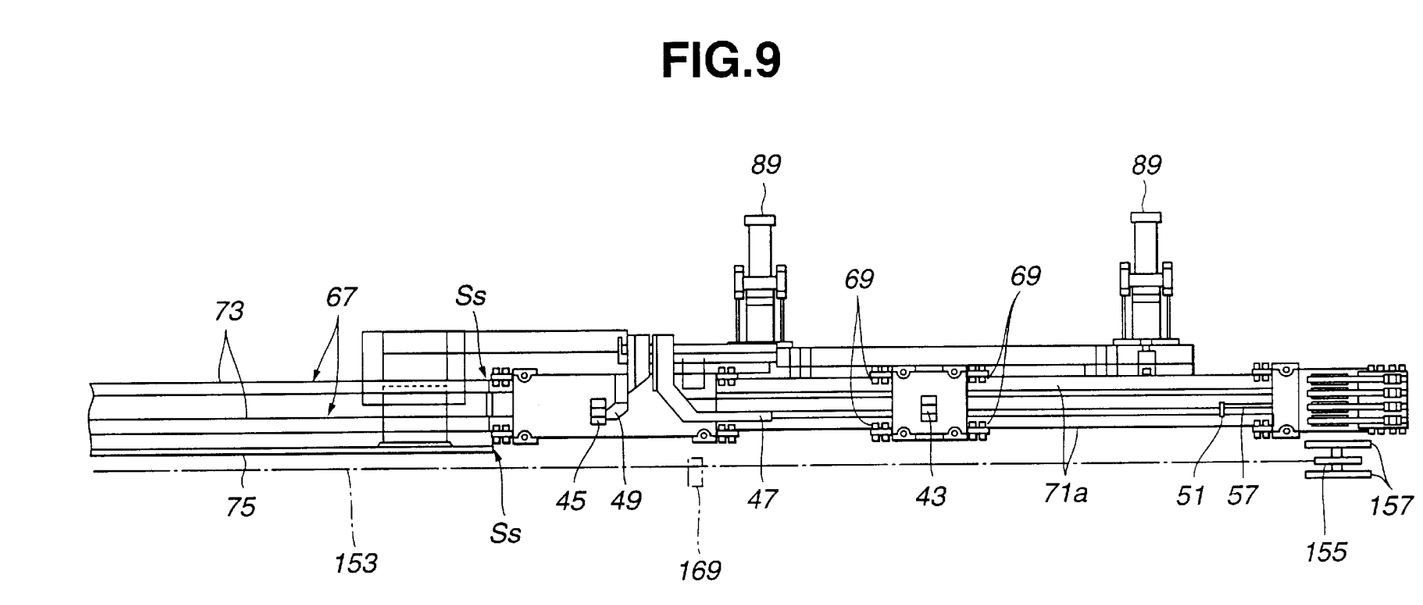
FIG. 9 is a partial top view of the work conveying apparatus of the second embodiment.

Under the condition shown in FIG. 8, the starting-stage selector rails 71a and the terminating-stage selector rails 71b are located at the horizontal positions extending from the conveying rails 73. Under this condition, the rearmost conveying carriage 41 is set on the starting-stage selector rails 71a, and the foremost conveying carriage 41 is set on the conveying rails 73 adjacent to the terminating-stage selector rails 71b. Further, the other conveying carriages 41 are continuously set on the conveying rails 73 between the foremost and rearmost conveying carriages 41. That is, under this condition, no conveying carriage 41 is set on the terminating-stage selector rails 71b. The other conveying carriages 41 are continuously set on the returning rails 75.

First the conveying finger levers 107 are set such that the projections 105 of the conveying carriages 41 on the conveying rails 73 and the starting-stage selector rails 71a are supported to the conveying finger levers 107, respectively, and that the projections 109 of the conveying carriages 41.

Next, the drive motor 141 is rotated in the right direction. By these operations, the pinion 139 is rotated and the rack 137 is moved by one pitch toward the conveying direction together with the conveying bar 133. Due to this one-pitch movement, each conveying carriage 41 on the guide rails 67 is conveyed in the conveying direction by one-pitch. According to this one-pitch movement of the conveying carriage 41, the foremost conveying carriage 41 on the conveying rails 73 adjacent the terminating-stage selector rails 71b is moved to the terminating-stage selector rails 71b, and the work W set on the conveying carriage 41 of the terminating state is then detached from the conveying carriage 41. The conveying carriage 41 on the starting-stage selector rails 71a is moved to the conveying rails 73 adjacent to the starting-stage selector rails 71a. Therefore, as a result of this operation, no conveying carriage 41 exists on the starting-stage selector rails 71a.

Next, the rail selecting cylinder 89 shown in FIG. 10 is operated to rotate the starting-stage selector rails 71a by 90 degrees from the horizontal position represented by continuous lines in FIG. 10 to the vertical position represented by the two-dot chain lines in FIG. 10. Similarly, the terminating-stage selector rails 71b are rotated by 90 degrees from the horizontal position to the vertical position.

Thereafter, the return drive motor 165 is driven to rotate the sprocket 159. By this rotation of the sprocket 159, the fixing projections 169 provided to the chain 153 are in contact with the return projections 167 of the conveying carriages 41 set on the returning rails 75 and the terminating stage selector rails 71b set at the vertical position, and move the return projections 167 toward the returning direction to move the conveying carriages 41 set at the vertical position toward the returning direction by one-pitch. By this one-pitch return movement, the conveying carriage 41 on the terminating-stage selector rails 71b is moved to the return rails 75 adjacent to the terminating stage, and the conveying carriage 41 set on the return rails 75 adjacent to the starting stage is moved to the starting state selector rails 71a set at the vertical position.

Under this condition, the rail selecting cylinder 89 is operated to rotate the starting-stage selector rails 71a with the conveying carriage 41 from the vertical position to the horizontal position by 90 degrees. Then, the new work W is installed to the conveying carriage 41 set on the starting-stage selector rails 71.

Then, each conveying carriage 41 on the conveying rails 73 is moved in the conveying direction by one pitch as mentioned above.

With the thus arranged work conveying apparatus of the second embodiment according to the present invention, the movement of the conveying carriages 41 between the returning rails 75 and the conveying rails 73 is executed by rotating the starting-stage selector rails 71a and the terminating-stage selector rails 71b by 90 degrees as same in the first embodiment. Therefore, advantages gained by the first embodiment are also ensured by the arrangement of the second embodiment.

The entire contents of Japanese Patent Applications No. 11-8263 and 11-8274 respectively filed on Jan. 14, 1999 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A work conveying apparatus comprising:

a conveying rail;

a returning rail disposed along said conveying rail;

a starting-stage selector rail parallel to said conveying rail, said starting-stage selector rail being swingable between a first position straightly extending from an end of said conveying rail and a second position straightly extending from an end of said returning rail;

a terminating-stage selector rail parallel to said conveying rail, said terminating-stage selector rail being swingable between a third position straightly extending from the other end of said conveying rail and a fourth position straightly extending from the other end of said returning rail;

a plurality of conveying carriages moved on said conveying rail and said returning rail, said conveying carriage conveying a work from said starting-stage selector rail to said terminating-stage selector rail through said conveying rail; and a carriage drive mechanism moving said conveying carriages on said conveying rail, said return rail, said starting-stage selector rail and said terminating-stage selector rail, said carriage drive mechanism comprising a reciprocating member and a supporting member, the reciprocating member being disposed along said conveying rail and being reciprocatingly movable along said conveying rail, the supporting member is connected to the reciprocating member and being selectively connected to a portion of each of said conveying carriages.

2. A work conveying apparatus as claimed in claim 1, wherein said returning rail is located on a plane which is perpendicular to a representative plane including said conveying rail through 90 degrees.

3. A work conveying apparatus as claimed 1, in claimed wherein said returning rail is located at a position which is obtained by rotating a position of said conveying rail through 90 degrees about a center axis along a work conveying direction.

4. A work conveying apparatus as claimed in claim 1, wherein said conveying rail includes a pair of rails which are arranged to be parallel with each other and to extend straightly on a horizontal plane, and said returning rail includes a pair of rails which are arranged to be parallel with each other and to extend straightly on a vertical plane.

5. A work conveying apparatus as claimed in claim 1, wherein said starting-stage selector rail is swung from the second position to the first position to convey said conveying carriage from said returning rail to said conveying rail, and said terminating-state selector rail is swung from the third position to the fourth position to convey said conveying carriage from said conveying rail to said returning rail parallel to said conveying rail.

6. A work conveying apparatus as claimed in claim 1, wherein the supporting member includes a conveying support member which supports each of said conveying carriages set on said conveying rail and said selector rail at the horizontal position, and a returning support member which supports each of said conveying carriages set on said conveying rail and said selector rail at the vertical position, both of the conveying support member and the returning support member selectively taking one of a connecting state and a disconnecting state, respectively.

7. A work conveying apparatus as claimed in claim 1, wherein the reciprocating member includes a rack along said conveying rail, the rack being reciprocatingly moved by a rotation of a pinion engaged with the rack.

8. A work conveying apparatus comprising:
a conveying rail;
a returning rail disposed along said conveying rail;
a starting-stage selector rail parallel to said conveying rail, said starting-stage selector rail being swingable between a first position straightly extending from an end of said conveying rail and a second position straightly extending from an end of said returning rail;
a terminating-stage selector rail parallel to said conveying rail, said terminating-stage selector rail being swingable between a third position straightly extending from the other end of said conveying rail and a fourth position straightly extending from the other end of said returning rail;
a plurality of conveying carriages moved on said conveying rail and said returning rail, said conveying carriage conveying a work from said starting-stage selector rail to said terminating-stage selector rail through said conveying rail; and
a carriage drive mechanism moving said conveying carriages on said conveying rail, said return rail, said starting-stage selector rail and said terminating-stage selector rail, said carriage drive mechanism comprising a carriage conveying mechanism which moves said conveying carriages disposed on said conveying rail and said starting-stage selector rail set at the first position in a conveying direction, and a carriage returning mechanism which moves said conveying carriages disposed on said returning rail and said terminating-stage selector rail set at the fourth position in a returning direction;
wherein the carriage conveying mechanism comprises a conveying finger lever connected to said conveying carriage and a carriage transfer mechanism which is disposed under said conveying rail, the carriage transfer mechanism reciprocatingly moving the conveying finger lever along the conveying direction.

9. A work conveying apparatus comprising:
a conveying rail;
a returning rail disposed along said conveying rail;
a starting-stage selector rail parallel to said conveying rail, said starting-stage selector rail being swingable between a first position straightly extending from an end of said conveying rail and a second position straightly extending from an end of said returning rail;
a terminating-stage selector rail parallel to said conveying rail, said terminating-stage selector rail being swingable between a third position straightly extending from the other end of said conveying rail and a fourth position straightly extending from the other end of said returning rail;
a plurality of conveying carriages moved on said conveying rail and said returning rail, said conveying carriage conveying a work from said starting-stage selector rail to said terminating-stage selector rail through said conveying rail; and
a carriage drive mechanism moving said conveying carriages on said d conveying rail, said return rail, said starting-stage selector rail and said terminating-stage selector rail, said carriage drive mechanism comprising a carriage conveying mechanism which moves said conveying carriages disposed on said conveying rail and said starting-stage selector rail set at the first position in a conveying direction, and a carriage returning mechanism which moves said conveying carriages disposed on said returning rail and said terminating-stage selector rail set at the fourth position in a returning direction;
wherein the carriage returning mechanism comprises a returning finger lever connected to said conveying carriage and a carriage transfer mechanism which is disposed under said conveying rail, the carriage transfer mechanism reciprocatingly moving the returning finger lever along the returning direction.

10. A work conveying apparatus comprising:
a conveying rail;
a returning rail disposed along said conveying rail;
a starting-stage selector rail parallel to said conveying rail, said starting-stage selector rail being swingable between a first position straightly extending from an end of said conveying rail and a second position straightly extending from an end of said returning rail;
a terminating-stage selector rail parallel to said conveying rail, said terminating-stage selector rail being swingable between a third position straightly extending from the other end of said conveying rail and a fourth position straightly extending from the other end of said returning rail;
a plurality of conveying carriages moved on said conveying rail and said returning rail, said conveying carriage conveying a work from said starting-stage selector rail to said terminating-stage selector rail through said conveying rail; and
a carriage drive mechanism moving said conveying carriages on said conveying rail, said return rail, said starting-stage selector rail and said terminating-stage selector rail, said carriage drive mechanism comprising a carriage conveying mechanism which moves said conveying carriages disposed on said conveying rail and said starting-stage selector rail set at the first position in a conveying direction, and a carriage returning mechanism which moves said conveying carriages disposed on said returning rail and said terminating-stage selector rail set at the fourth position in a returning direction;
wherein the carriage returning mechanism comprises a starting-stage sprocket disposed in the vicinity of said starting-stage selector rail, a terminating-stage sprocket in the vicinity of the terminating-stage selector rail, an endless chain wound around the starting-stage sprocket and the terminating-stage sprocket, a return projection which is projected from each of said conveying carriages, and a plurality of fixing projections installed to said endless chain at predetermined intervals, the fixing projections being in contact with the return projections, respectively, when said conveying carriages are returned from the terminating stage to the starting stage.

* * * * *